(12) United States Patent
Saitou et al.

(10) Patent No.: US 7,988,595 B2
(45) Date of Patent: Aug. 2, 2011

(54) CONTROL DEVICE FOR AUTOMATIC TRANSMISSION FOR VEHICLE

(75) Inventors: Yoshiharu Saitou, Wako (JP); Akio Muto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 860 days.

(21) Appl. No.: 12/020,277

(22) Filed: Jan. 25, 2008

(65) Prior Publication Data

US 2008/0182714 A1 Jul. 31, 2008

(30) Foreign Application Priority Data

Jan. 25, 2007 (JP) ................. 2007-014557

(51) Int. Cl.
*F16H 61/58* (2006.01)
(52) U.S. Cl. ........................................ 477/65
(58) Field of Classification Search ............... None
See application file for complete search history.

(56) References Cited

U.S. PATENT DOCUMENTS

| | | | | |
|---|---|---|---|---|
| 4,811,827 | A | * | 3/1989 | Ishikawa et al. ........... 477/63 |
| 4,940,122 | A | * | 7/1990 | Fujieda ..................... 192/3.31 |
| 5,480,363 | A | * | 1/1996 | Matsubara et al. ......... 477/63 |
| 5,505,670 | A | * | 4/1996 | Inuzuka et al. ............. 477/65 |
| 5,598,336 | A | | 1/1997 | Kume et al. |
| 5,669,848 | A | | 9/1997 | Kondo et al. |
| 5,975,262 | A | * | 11/1999 | Saito et al. ................ 192/3.31 |
| 7,287,631 | B2 | * | 10/2007 | Imamura et al. .......... 192/3.3 |
| 2008/0182721 | A1 | * | 7/2008 | Saitou et al. .............. 477/176 |
| 2009/0192015 | A1 | * | 7/2009 | Lee et al. ................... 477/65 |

FOREIGN PATENT DOCUMENTS

| | | |
|---|---|---|
| EP | 0 310 117 A1 | 4/1989 |
| EP | 0 445 770 A | 9/1991 |
| JP | 62-017453 | 1/1987 |
| JP | 01-203755 | 8/1989 |
| JP | 02-017258 | 1/1990 |
| JP | 5-180328 A | 7/1993 |
| JP | 05-231622 | 9/1993 |
| JP | 06-137418 | 5/1994 |
| JP | 07-071589 | 3/1995 |
| JP | 08-152060 | 6/1996 |
| JP | 09-072412 | 3/1997 |
| JP | 09-112682 | 5/1997 |
| JP | 10-252885 | 9/1998 |
| JP | 2000-193080 | 7/2000 |

* cited by examiner

*Primary Examiner* — Dirk Wright
(74) *Attorney, Agent, or Firm* — Arent Fox LLPX

(57) ABSTRACT

A control device for an automatic transmission for a vehicle including a torque converter interposed between an output shaft of an engine and an input shaft of the automatic transmission, the torque converter having a lock-up clutch for mechanically connecting the output shaft and the input shaft in a direct manner, and a lock-up clutch engagement control unit for engaging the lock-up clutch by a predetermined engagement force in a predetermined operational region determined by a throttle angle and a vehicle speed. The control device further includes a shift map having a slip region for the lock-up clutch set in relation to a plurality of shift characteristics preliminarily set according to vehicle speeds, the slip region being defined by a downshift line and a slip start line deviated from the downshift line by a predetermined range of throttle angle toward lower throttle angles. When the throttle angle falls within the slip region before kickdown, the slip control of the lock-up clutch is performed by the lock-up clutch engagement control unit.

3 Claims, 10 Drawing Sheets

FIG.6

| DAPPKD(5TH) | | | | | | | | | | | | |
|---|---|---|---|---|---|---|---|---|---|---|---|---|
| 5TH | 40 | 45 | 50 | 55 | 60 | 75 | 90 | 100 | 110 | 120 | 130 | 140 |
| N | 0 | 0.2 | 0.2 | 0.3 | 0.3 | 0.3 | 0.3 | 0 | 0 | 0 | 0 | 0 |
| L | 0 | 0.2 | 0.2 | 0.3 | 0.3 | 0.3 | 0.3 | 0.3 | 0 | 0 | 0 | 0 |
| M | 0 | 0 | 0.3 | 0.3 | 0.3 | 0.3 | 0.3 | 0.3 | 0.3 | 0 | 0 | 0 |
| H | 0 | 0 | 0 | 0.3 | 0.4 | 0.4 | 0.4 | 0.4 | 0.4 | 0.4 | 0 | 0 |
| H2 | 0 | 0 | 0 | 0.3 | 0.5 | 0.5 | 0.5 | 0.5 | 0.5 | 0.5 | 0.5 | 0 |

FIG.7

| DAPPKD (4TH) | | | | | | | | | | | | | | |
|---|---|---|---|---|---|---|---|---|---|---|---|---|---|---|
| 4TH | 30 | 35 | 40 | 45 | 50 | 55 | 60 | 70 | 80 | 90 | 100 | 110 |
| N | 0 | 0 | 0 | 0 | 0 | 0 | 0 | 0 | 0 | 0 | 0 | 0 |
| L | 0 | 0 | 0 | 0 | 0 | 0 | 0 | 0 | 0 | 0 | 0 | 0 |
| M | 0 | 0.2 | 0.2 | 0.3 | 0.3 | 0.3 | 0.3 | 0.3 | 0.2 | 0 | 0 | 0 |
| H | 0 | 0.2 | 0.2 | 0.3 | 0.4 | 0.4 | 0.4 | 0.3 | 0.3 | 0.2 | 0 | 0 |
| H2 | 0 | 0 | 0.2 | 0.4 | 0.4 | 0.4 | 0.4 | 0.4 | 0.4 | 0.3 | 0 | 0 |

CONTROL DEVICE FOR AUTOMATIC TRANSMISSION FOR VEHICLE

BACKGROUND OF THE INVENTION

1. Field of the Invention

The present invention relates generally to a control device for an automatic transmission for a vehicle, and more particularly to a control device for an automatic transmission for a vehicle for performing the slip control of a lock-up clutch at a predetermined gear position before kickdown.

2. Description of the Related Art

In general, an automatic transmission having a torque converter includes a lock-up clutch for directly connecting an output shaft of an engine and an input shaft of the automatic transmission in the condition where the gear position of the automatic transmission is a predetermined gear position and the rotational speed of the engine is greater than or equal to a predetermined rotational speed, in order to improve the fuel economy. A lock-up clutch engagement characteristic line is set in a shift map, and the lock-up clutch is controlled to be engaged at a vehicle speed higher than that corresponding to the lock-up clutch engagement characteristic line. In the case of kickdown, the lock-up clutch is controlled to be disengaged at the time the accelerator pedal angle becomes larger than that corresponding to the lock-up clutch engagement characteristic line. Further, in the case of running on an uphill road, the lock-up clutch engagement characteristic line is shifted toward higher vehicle speeds to limit the engagement of the lock-up clutch in a high vehicle speed region.

As mentioned above, the lock-up clutch engagement characteristic line is fixedly set in the shift map in the prior art. Accordingly, in the case that the lock-up clutch engagement characteristic line is shifted toward higher vehicle speeds to reduce the range of the lock-up region, smooth running can be attained. However, the fuel consumption is increased. Conversely, in the case that the range of the lock-up region is set wide, the fuel consumption can be reduced. However, smooth running becomes difficult to attain in this case. Thus, it is difficult to attain both the reduction in fuel consumption and the improvement in drivability.

SUMMARY OF THE INVENTION

It is therefore an object of the present invention to provide a control device for an automatic transmission for a vehicle which can attain smooth running and low fuel consumption by performing the slip control of a lock-up clutch before kickdown.

In accordance with an aspect of the present invention, there is provided a control device for an automatic transmission for a vehicle, including a torque converter interposed between an output shaft of an engine and an input shaft of the automatic transmission, the torque converter having a lock-up clutch for mechanically connecting the output shaft and the input shaft in a direct manner; lock-up clutch engagement control means for engaging the lock-up clutch by a predetermined engagement force in a predetermined operational region determined by a throttle angle and a vehicle speed; and a shift map having a slip region for the lock-up clutch set in relation to a plurality of shift characteristics preliminarily set according to vehicle speeds, the slip region being defined by a downshift line and a slip start line deviated from the downshift line by a predetermined range of throttle angle toward lower throttle angles; wherein when the throttle angle falls within the slip region before kickdown, the slip control of the lock-up clutch is performed by the lock-up clutch engagement control means.

With this configuration, the lock-up clutch can be slipped at an optimum throttle angle before kickdown. Accordingly, smooth running and low fuel consumption can be attained.

Preferably, when downshift is not performed within a predetermined period of time from the start of the slip control of the lock-up clutch, the slip control of the lock-up clutch is canceled to engage the lock-up clutch. By canceling the slip control of the lock-up clutch to engage the lock-up clutch in such a case, the fuel economy can be improved.

Preferably, the predetermined range of throttle angle is set wider on an uphill road than on a level road. By changing the range of the slip control of the lock-up clutch according to the slope of a road surface, the drivability both on a level road and on an uphill road cab be improved.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is a table showing a pre-kickdown lock-up clutch slip determination $\Delta AP$ amount according to a vehicle speed and a road surface slope in the case of a fifth gear position;

FIG. 7 is a table similar to FIG. 6 in the case of a fourth gear position;

DETAILED DESCRIPTION OF THE PREFERRED EMBODIMENTS

Figure 1:
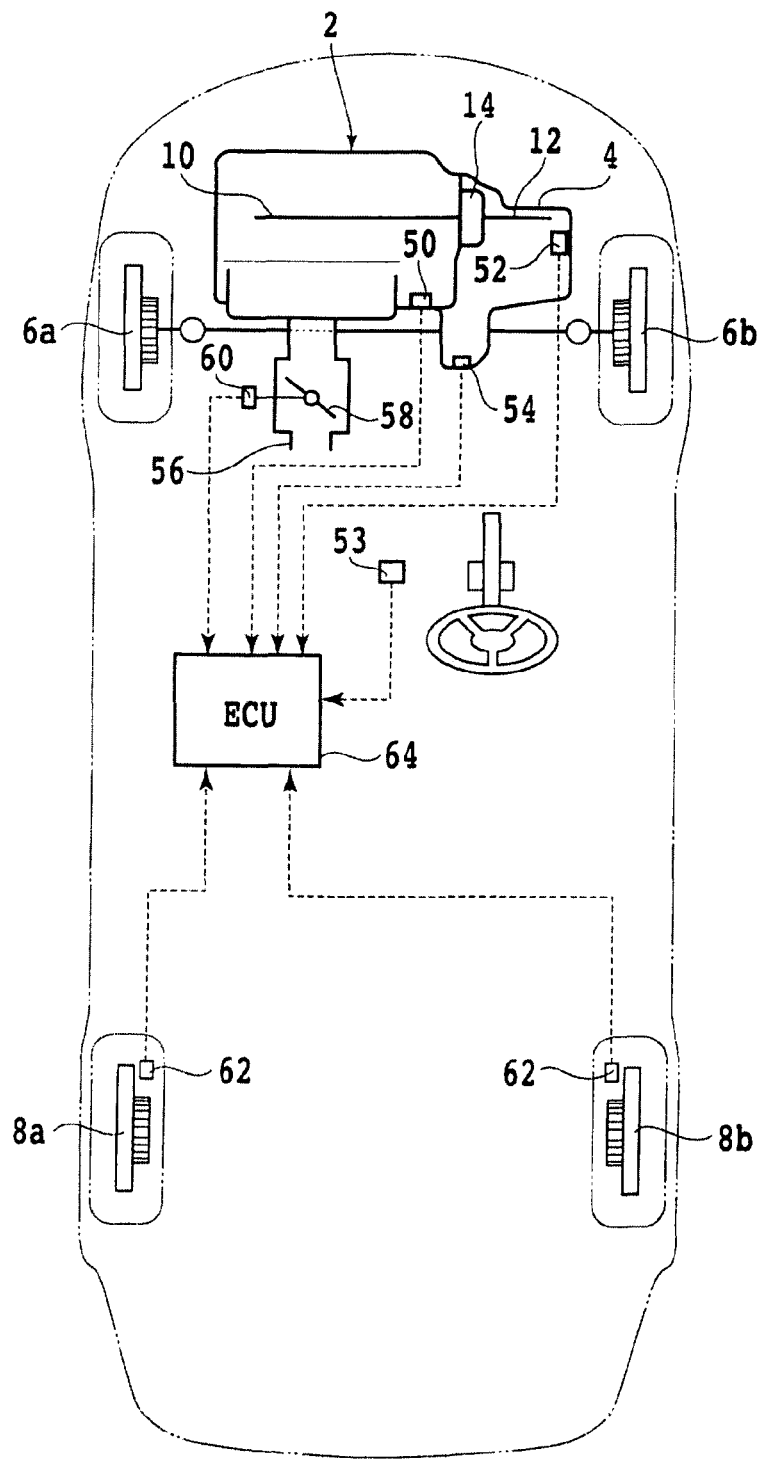
FIG. 1 is a schematic plan view showing a general configuration of a vehicle including a slip control device for a lock-up clutch according to a preferred embodiment of the present invention.
Figure 3:
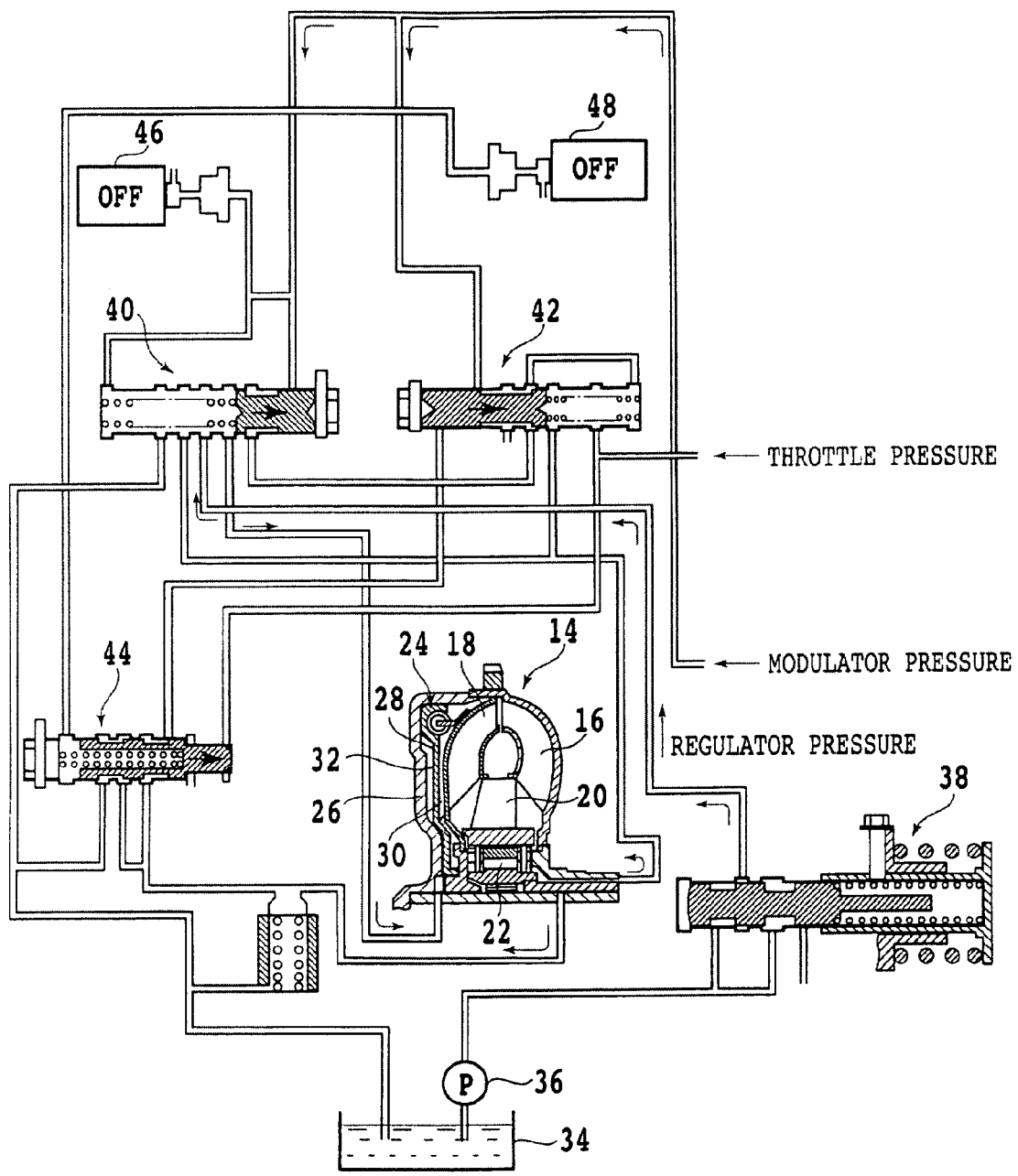
FIG. 3 is a hydraulic circuit diagram of a torque converter in disengaging the lock-up clutch.
Figure 4:
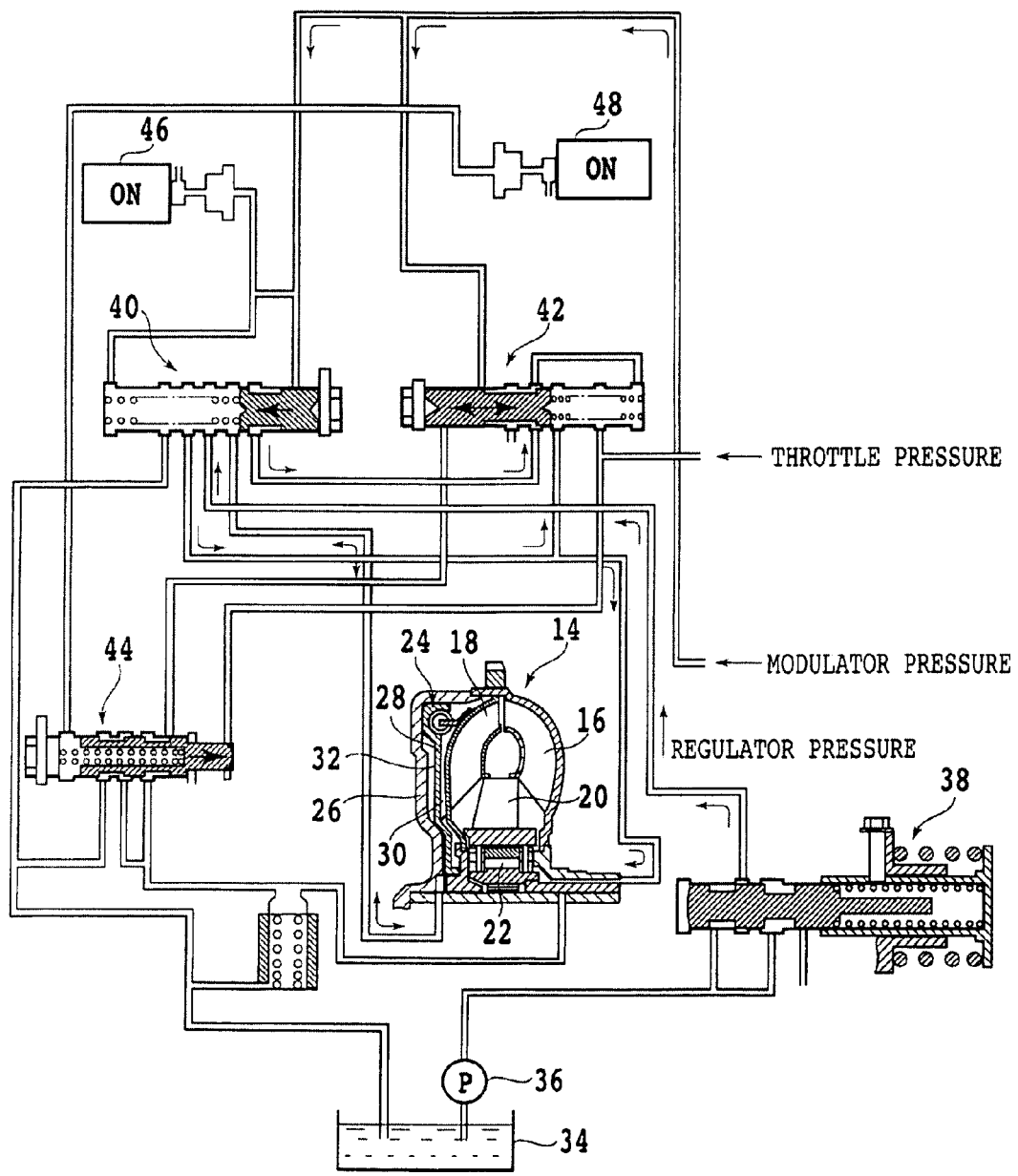
FIG. 4 is a hydraulic circuit diagram of the torque converter in engaging the lock-up clutch.

FIG. 1 is a schematic plan view showing a general configuration of a vehicle including the control device according to the present invention. This vehicle is a front-wheel drive vehicle, which includes a pair of left and right drive wheels 6a and 6b to which the torque of an engine 2 is transmitted through an automatic transmission 4 and a pair of left and right driven wheels 8a and 8b rotating with running of the vehicle. A known torque converter 14 is interposed between a crankshaft 10 of the engine 2 and a main shaft 12 of the automatic transmission 4. Referring to FIG. 3, there is shown a hydraulic circuit diagram of the torque converter 14 in disengaging a lock-up clutch. FIG. 4 is a hydraulic circuit diagram of the torque converter 14 in engaging the lock-up clutch.

As shown in FIG. 3, the torque converter 14 includes a pump impeller 16 connected to the crankshaft 10, a turbine runner 18 connected to the main shaft 12, a stator 20 supported through a one-way clutch 22 to a fixed portion, and a lock-up clutch 24 adapted to connect the pump impeller 16 and the turbine runner 18. The lock-up clutch 24 includes a clutch piston 28 adapted to abut against the inner surface of a torque converter cover 26. A first oil chamber 30 and a second oil chamber 32 are formed on both sides of the clutch piston 28.

When pressurized oil is supplied to the first oil chamber 30 to bring the clutch piston 28 into abutment against the torque converter cover 26, the lock-up clutch 24 is engaged to thereby transmit the torque of the crankshaft 10 directly to the main shaft 12. Conversely, when pressurized oil is supplied to the second oil chamber 32 to bring the clutch piston 28 into separation from the torque converter cover 26, the lock-up clutch 24 is disengaged to thereby break the mechanical connection between the crankshaft 10 and the main shaft 12.

The hydraulic circuit of the torque converter 14 includes an oil pump 36 for pumping up a hydraulic fluid from an oil tank 34 and a regulator valve 38 for regulating the pressure of the hydraulic fluid from the oil pump 36 to a predetermined regulator pressure. A lock-up shift valve 40 functions to transmit the regulator pressure to the second oil chamber 32 of the torque converter 14 and to connect the first oil chamber 30 to the oil tank 34 when the lock-up clutch 24 is disengaged, whereas functions to transmit the regulator pressure to the first oil chamber 30 of the torque converter 14 and to connect the second oil chamber 32 to a lock-up control valve 42 which will be hereinafter described when the lock-up clutch 24 is engaged.

The lock-up control valve 42 functions to relieve the pressure of the hydraulic fluid supplied from the second oil chamber 32 through the lock-up shift valve 40 and to thereby regulate the pressure in the second oil chamber 32, thereby controlling an engagement force of the lock-up clutch 24. A lock-up timing valve 44 is operated by a throttle pressure at a high vehicle speed to thereby operate the lock-up control valve 42, thereby making the second oil chamber 32 open to the atmosphere to fully engage the lock-up clutch 24.

A first solenoid valve 46 is an on/off controlled valve. When the first solenoid valve 46 is turned off, a modulator pressure is transmitted to the left end of the lock-up shift valve 40 to rightward move the spool of the lock-up shift valve 40, so that the regulator pressure is transmitted to the second oil chamber 32 of the torque converter 14, and the first oil chamber 30 is connected to the oil tank 34, thereby disengaging the lock-up clutch 24. When the first solenoid valve 46 is turned on, the modulator pressure is relieved to leftward move the spool of the lock-up shift valve 40, so that the regulator pressure is transmitted to the first oil chamber 30 of the torque converter 14, and the second oil chamber 32 is connected to the lock-up control valve 42, thereby engaging the lock-up clutch 24.

A second solenoid valve 48 is a linear solenoid valve. When the second solenoid valve 48 is turned off, the modulator pressure is transmitted to the lock-up control valve 42 and the lock-up timing valve 44 to rightward bias the spool of the lock-up control valve 42 and the spool of the lock-up timing valve 44. When the second solenoid valve 48 is turned on, the modulator pressure is relieved to cancel the above-mentioned biasing force. The degree of opening of the lock-up control valve 42 can be steplessly controlled by changing the value of a current supplied to the second solenoid valve 48. When the degree of opening of the lock-up control valve 42 is increased, the back pressure in the second oil chamber 32 of the torque converter 14 is decreased to thereby increase the engagement force of the lock-up clutch 24. Conversely, when the degree of opening of the lock-up control valve 42 is decreased, the back pressure in the second oil chamber 32 of the torque converter 14 is increased to thereby decrease the engagement force of the lock-up clutch 24.

Referring again to FIG. 1, the engine 2 is provided with engine speed detecting means 50 for detecting an engine speed Ne, and the automatic transmission 4 is provided with main shaft speed detecting means 52 for detecting a main shaft speed Nm and shift position detecting means 54 for detecting a shift position P. A throttle valve 58 is provided in an intake passage 56. The throttle valve 58 is provided with throttle angle detecting means 60 for detecting a throttle angle $\theta_{TH}$. Further, each of the rear wheels 8a and 8b as the driven wheels is provided with vehicle speed detecting means 62 for detecting a vehicle speed V. Reference numeral 53 denotes slope detecting means for detecting the slope of a road surface on which the vehicle is running. In this preferred embodiment, a G sensor for computing the slope from a longitudinal acceleration G of the vehicle is used as the slope detecting means 53. As a modification, the slope detecting means 53 may be provided by means for directly detecting the angle of inclination of a vehicle body with respect to a horizontal plane.

Figure 2:
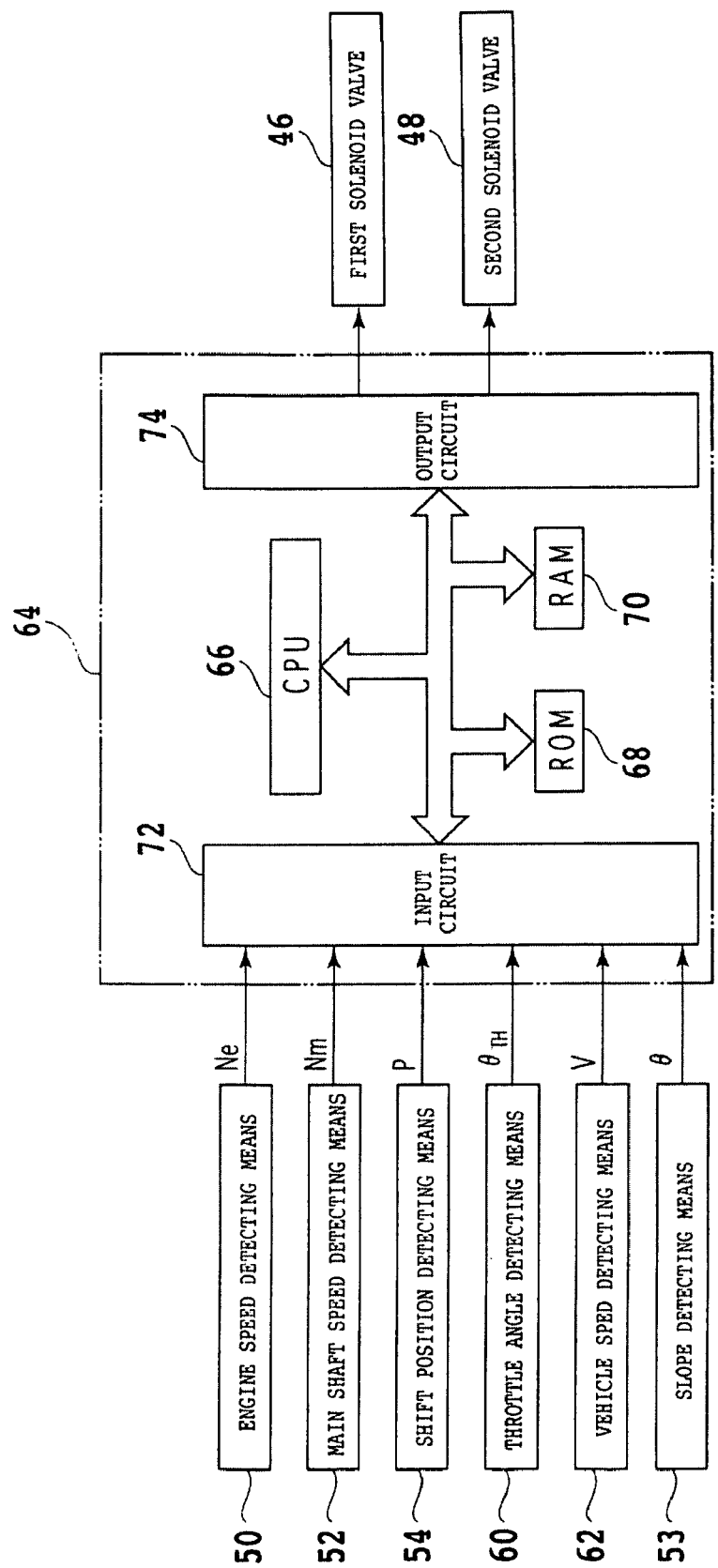
FIG. 2 is a block diagram of an electronic control unit.

FIG. 2 shows an electronic control unit (ECU) 64 for performing computations on output signals from the various detecting means mentioned above according to a control program and driving the first and second solenoid valves 46 and 48 to control the speed ratio of the torque converter 14. The electronic control unit 64 includes a central processing unit (CPU) 66 for performing the computations, a read only memory (ROM) 68 preliminarily storing the control program and data such as various tables, and a random access memory (RAM) 70 for temporarily storing the output signals from the various detecting means and the results of the computations.

The electronic control unit 64 further includes an input circuit 72 to which the engine speed detecting means 50, the main shaft speed detecting means 52, the slope detecting means 53, the shift position detecting means 54, the throttle angle detecting means 60, and the vehicle speed detecting means 62 are connected, and an output circuit 74 to which the first solenoid valve 46 and the second solenoid valve 48 are connected. Thus, the CPU 66 in the electronic control unit 64 performs computations on the various signals input through the input circuit 72 and on the data stored in the ROM 68 according to the control program to be hereinafter described, and controls the values of currents supplied through the output circuit 74 to the first and second solenoid valves 46 and 48. Accordingly, the engagement force of the lock-up clutch 24 can be changed to control the speed ratio of the torque converter 14.

The slip control of the lock-up clutch before kickdown according to the preferred embodiment of the present invention will now be described in detail with reference to the flowchart shown in FIG. 5. In step S10, it is determined whether or not the lock-up clutch (LC) is under the slip control, i.e., whether or not a pre-kickdown LC slip control flag F_LCOFPKD is on. If the answer in step S10 is negative, the program proceeds to step S11 to retrieve a pre-kickdown LC slip determination ΔAP amount DAPPKD.

For example, when the present gear position is a fifth gear position, DAPPKD is set according to the slope of a road surface as shown in FIG. 6, whereas when the present gear position is a fourth gear position, DAPPKD is set according to the slope of a road surface as shown in FIG. 7. In FIGS. 6 and 7, N is a level road, L is a light uphill road, M is a medium uphill road, H is a heavy uphill road, and H2 is a double heavy uphill road. In FIG. 6, for example, 0.2 indicates that the throttle angle is 0.2/8, and 0.5 indicates that the throttle angle is 0.5/8.

Figure 5:
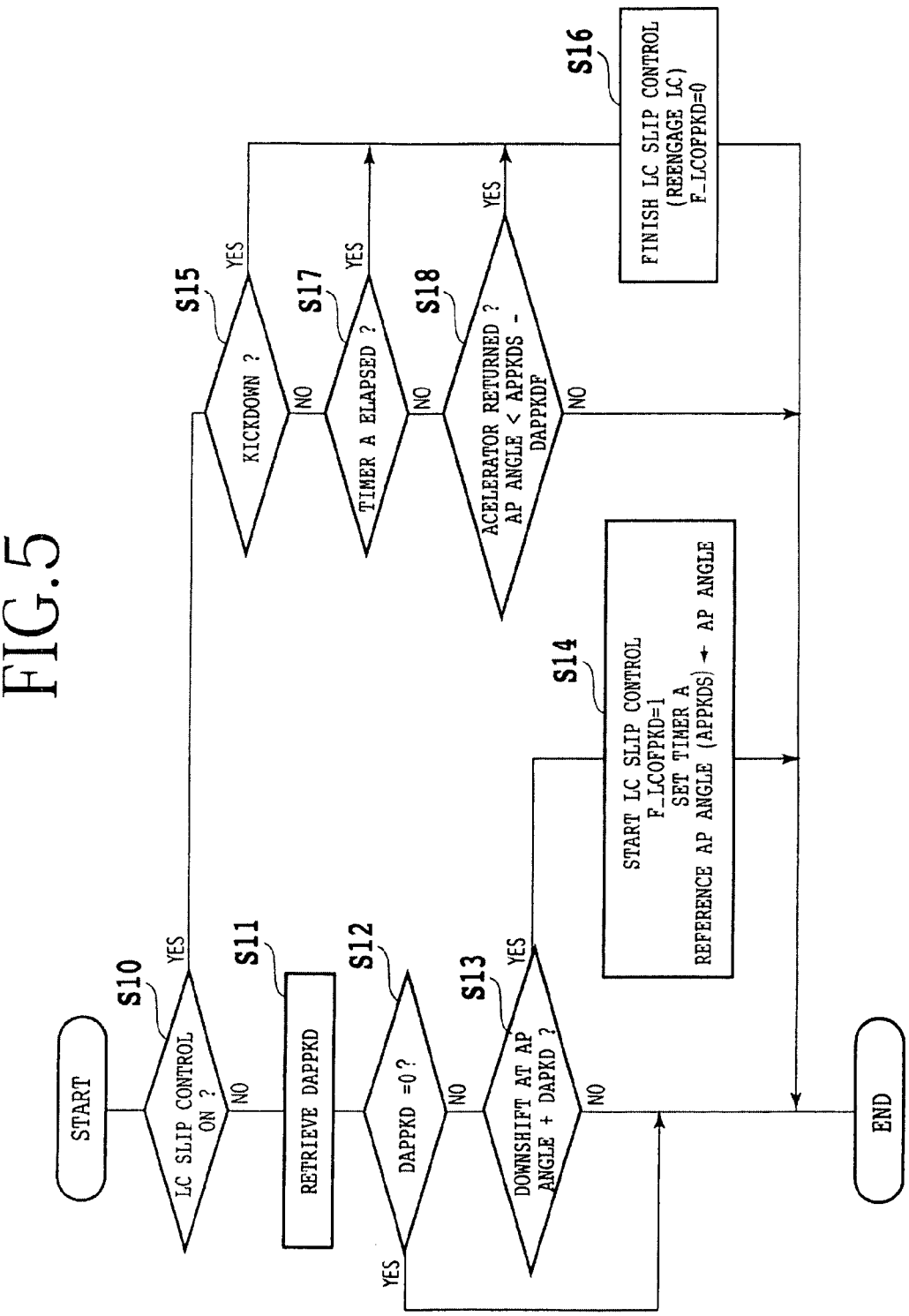
FIG. 5 is a flowchart showing the control sequence of the slip control of the lock-up clutch before kickdown according to the preferred embodiment of the present invention.

Referring again to the flowchart shown in FIG. 5, the program proceeds to step S12 after retrieving DAPPKD in step S11. In step S12, it is determined whether or not DAPPKD is 0. If the answer in step S12 is negative, the program proceeds to step S13 to determine whether or not downshift is to be performed at the present accelerator pedal angle (AP angle)+DAPPKD. If the answer in step S13 is affirmative, the program proceeds to step S14 to start the slip control of the lock-up clutch that has been engaged. Further, the pre-kickdown LC slip control flag F_LCOFPKD is set, and a timer A is set to a predetermined time.

Further, the accelerator pedal angle is set to a reference accelerator pedal angle, i.e., a pre-kickdown LC slip control starting accelerator pedal angle APPKDS. By starting the slip control of the lock-up clutch in step S14, the engine speed is increased, so that a reduction in linearity due to the engagement of the lock-up clutch can be prevented. Accordingly, smooth running and low fuel consumption can be both attained. If the answer in step S12 is affirmative, i.e., if DAPPKD=0, it is unnecessary to perform the slip control of the lock-up clutch, and the program is therefore ended. Further, if the answer in step S13 is negative, the program is ended.

After starting the slip control of the lock-up clutch in step S14, the determination in step S10 with the next timing is that the lock-up clutch is under the slip control. Accordingly, the program proceeds to step S15 to determine whether or not kickdown (KD) has been performed. If the answer in step S15 is affirmative, the program proceeds to step S16 to finish the slip control according to the present invention. In other words, the lock-up clutch is reengaged and the pre-kickdown LC slip control flag F_LCOFPKD is reset to 0.

If the answer in step S15 is negative, the program proceeds to step S17 to determine whether or not the predetermined time set in the timer A has elapsed. If the answer in step S17 is affirmative, the program proceeds to step S16 to finish the slip control according to the present invention. If the answer in step S17 is negative, the program proceeds to step S18 to determine whether or not the accelerator pedal has been returned, i.e., whether or not AP angle<APPKDS−DAPPKDF, where DAPPKDF stands for a pre-kickdown LC slip control finishing ΔAP amount. If the result in step S18 is affirmative, the program proceeds to step S16 to finish the slip control according to the present invention, to reengage the lock-up clutch, and to reset the pre-kickdown LC slip control flag F_LCOFPKD.

Figure 8:
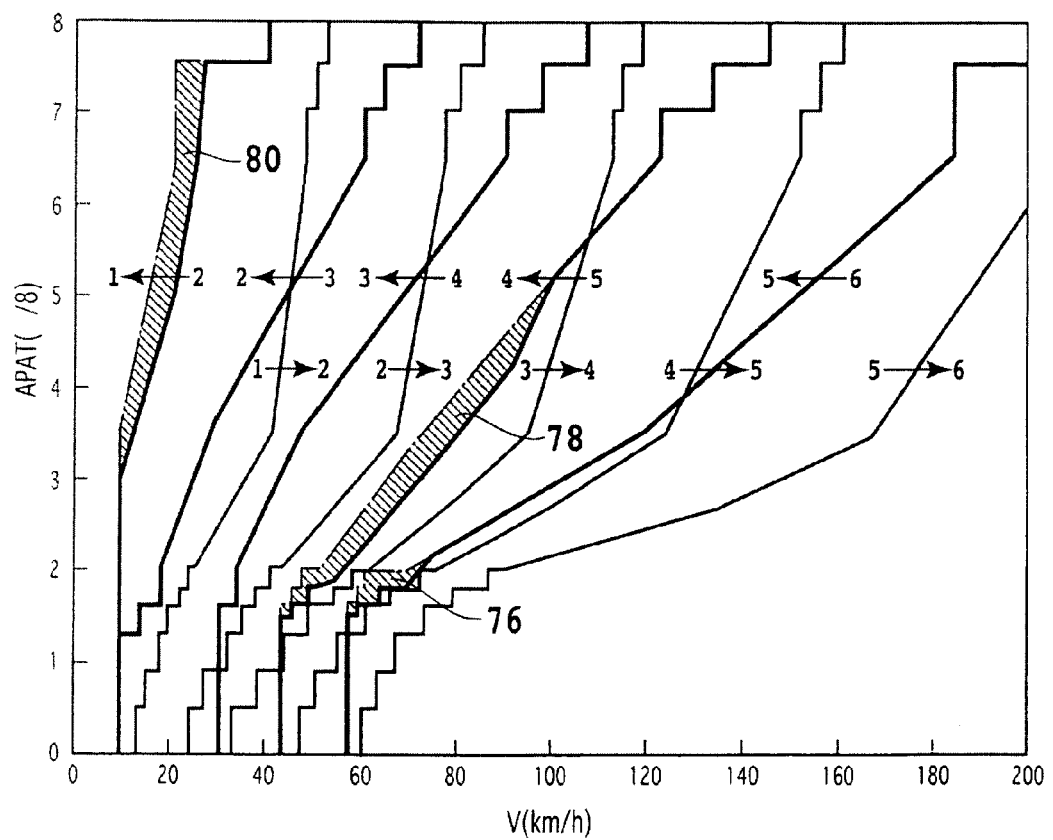
FIG. 8 is a graph showing a lock-up clutch slip control region on a shift map for a level road.

Referring to FIG. 8, there is shown a pre-kickdown LC slip control region on a shift map for a level road according to the preferred embodiment of the present invention. In FIG. 8, each heavy line shows an LC slip control start line. In this preferred embodiment, the pre-kickdown LC slip control region on the level road shift map includes an LC slip control region 76 before kickdown from the sixth gear position to the fifth gear position, an LC slip control region 78 before kickdown from the fifth gear position to the fourth gear position, and an LC slip control region 80 before kickdown from the second gear position to the first gear position.

As apparent from this shift map, in the condition where the vehicle can be accelerated without slipping the lock-up clutch, the slip control of the lock-up clutch is not performed. In other words, in this condition, each downshift line coincides with the corresponding LC slip control start line. In contrast, in the LC slip control regions 76, 78, and 80, the lock-up clutch is slipped before reaching the respective downshift lines. Accordingly, the engine speed can be increased to thereby increase the drive force, so that a reduction in linearity due to the engagement of the lock-up clutch can be prevented.

Figure 9:
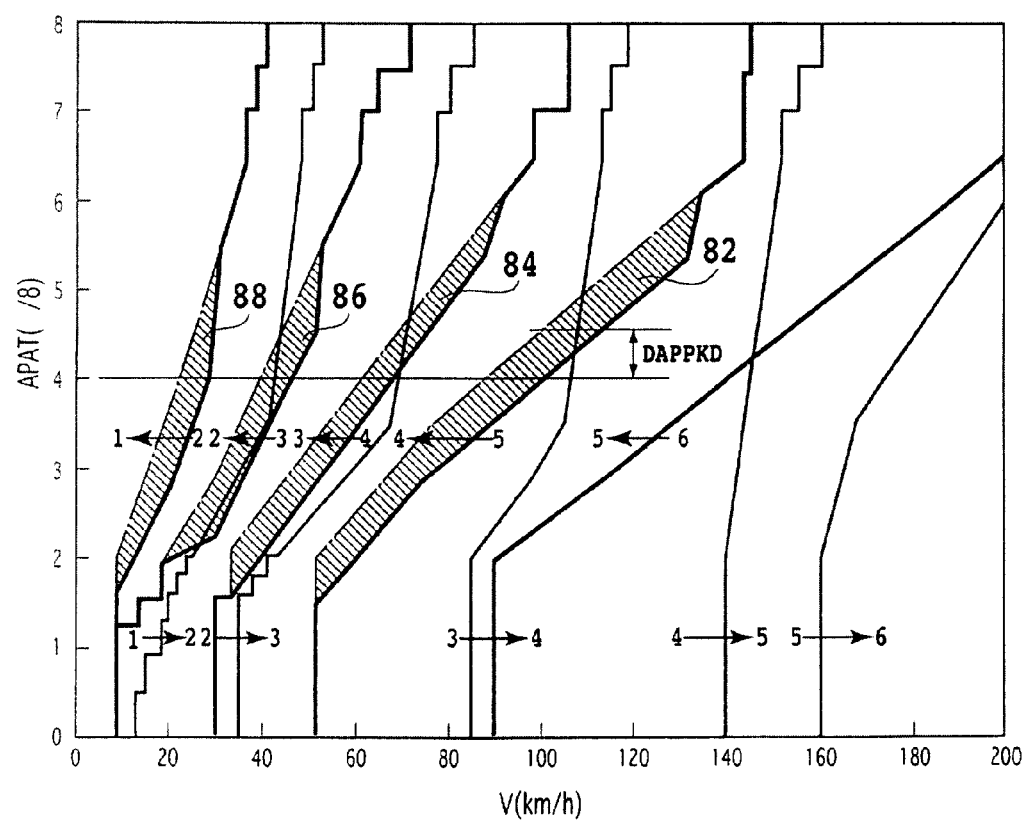
FIG. 9 is a graph showing a lock-up clutch slip control region on a shift map for a heavy uphill road.

Referring to FIG. 9, there is shown a pre-kickdown LC slip control region on a shift map for a steep upward slope (heavy uphill road) according to the preferred embodiment of the present invention. In this preferred embodiment, the pre-kickdown LC slip control region on the heavy uphill road shift map includes an LC slip control region 82 before kickdown from the fifth gear position to the fourth gear position, an LC slip control region 84 before kickdown from the fourth gear position to the third gear position, an LC slip control region 86 before kickdown from the third gear position to the second gear position, and an LC slip control region 88 before kickdown from the second gear position to the first gear position.

In FIG. 9, each heavy line shows an LC slip control start line similar to that shown in FIG. 8. However, as apparent from the comparison between FIG. 8 and FIG. 9, the slip control of the lock-up clutch on an uphill road is started at an accelerator pedal angle smaller than that on a level road. In other words, the range of the LC slip control region on an uphill road is set wider than that on a level road.

Figure 10:
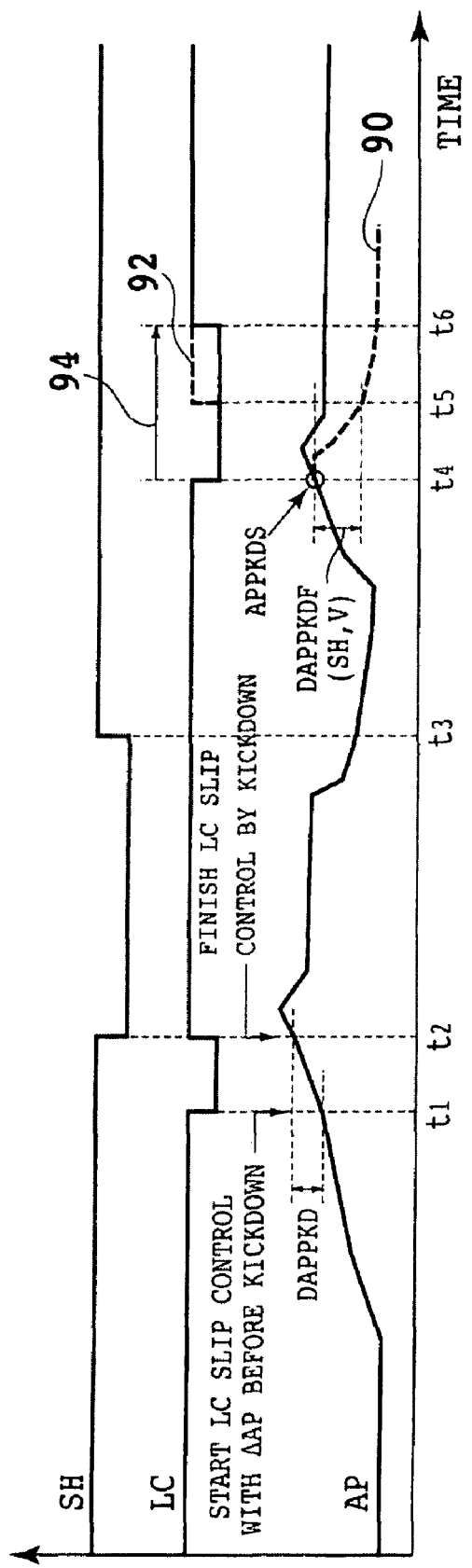
FIG. 10 is a time chart showing the pre-kickdown lock-up clutch slip control according to the preferred embodiment of the present invention.

The pre-kickdown LC slip control according to the preferred embodiment of the present invention will now be described more specifically with reference to the time chart shown in FIG. 10. In FIG. 10, SH stands for a gear position. At the time t1, it is determined that downshift is to be performed at AP angle+DAPPKD. Accordingly, the slip control of the lock-up clutch is started with ΔAP=DAPPKD before kickdown. At the time t2, kickdown is performed, and the slip control of the lock-up clutch is therefore finished to reengage the lock-up clutch. At the time t3, the downshift line is crossed to pass through the upshift line, so that the gear position is upshifted by one.

At the time t4, the AP angle becomes the pre-kickdown LC slip control starting accelerator pedal angle APPKDS, so that the slip control of the lock-up clutch is started. When the accelerator pedal is returned as shown by a broken line 90, the change in accelerator pedal angle from the time t4 to the time t5 becomes the pre-kickdown LC slip control finishing ΔAP amount=DAPPKDF. Accordingly, at the time t5, the slip control of the lock-up clutch is canceled to reengage the lock-up clutch as shown by a broken line 92. Also when the predetermined time set in the timer A as shown by an arrow 94 has elapsed at the time t6, the slip control of the lock-up clutch is canceled to reengage the lock-up clutch.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A control device for an automatic transmission for a vehicle, comprising:
   a torque converter interposed between an output shaft of an engine and an input shaft of said automatic transmission, said torque converter having a lock-up clutch for mechanically connecting said output shaft and said input shaft in a direct manner;
   lock-up clutch engagement control means for engaging said lock-up clutch by a predetermined engagement force in a predetermined operational region determined by a throttle angle and a vehicle speed; and
   a shift map having a slip region for said lock-up clutch set in relation to a plurality of shift characteristics preliminarily set according to vehicle speeds, said slip region being defined by a downshift line and a slip start line deviated from said downshift line by a predetermined range of throttle angle toward lower throttle angles;

wherein when the throttle angle falls within said slip region before kickdown, the slip control of said lock-up clutch is performed by said lock-up clutch engagement control means.

2. The control device according to claim 1, wherein when downshift is not performed within a predetermined period of time from the start of the slip control of said lock-up clutch, the slip control of said lock-up clutch is canceled to engage said lock-up clutch.

3. The control device according to claim 1, wherein said predetermined range of throttle angle is set wider on an uphill road than on a level road.

* * * * *